United States Patent
Naka

(10) Patent No.: US 8,781,643 B2
(45) Date of Patent: Jul. 15, 2014

(54) VEHICLE CONTROL DEVICE AND VEHICLE CONTROL METHOD

(75) Inventor: Takuya Naka, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 276 days.

(21) Appl. No.: 13/322,891

(22) PCT Filed: May 25, 2010

(86) PCT No.: PCT/JP2010/058775
§ 371 (c)(1),
(2), (4) Date: Nov. 28, 2011

(87) PCT Pub. No.: WO2010/137569
PCT Pub. Date: Dec. 2, 2010

(65) Prior Publication Data
US 2012/0072050 A1    Mar. 22, 2012

(30) Foreign Application Priority Data
May 29, 2009 (JP) .................................. 2009-130706

(51) Int. Cl.
*G05D 1/00* (2006.01)
*G06F 7/00* (2006.01)

(52) U.S. Cl.
USPC ........ 701/1; 701/23; 701/24; 701/25; 701/26; 701/300

(58) Field of Classification Search
USPC .......... 180/167, 168, 169, 401; 340/435, 436, 340/901, 903, 988; 342/129, 29, 70, 71; 701/1, 117, 23, 24, 25, 26, 3, 300, 301, 701/34.3, 36, 452, 48, 532, 93, 96
See application file for complete search history.

(56) References Cited

U.S. PATENT DOCUMENTS

| | | | |
|---|---|---|---|
| 6,370,261 B1 * | 4/2002 | Hanawa ........................ | 382/104 |
| 2002/0107637 A1 * | 8/2002 | Okamura et al. ............. | 701/301 |
| 2002/0196341 A1 * | 12/2002 | Kamijo et al. ................ | 348/149 |
| 2003/0174054 A1 * | 9/2003 | Shimomura .................. | 340/435 |

(Continued)

FOREIGN PATENT DOCUMENTS

| | | |
|---|---|---|
| JP | 11-213138 A | 8/1999 |
| JP | 2000-33860 A | 2/2000 |

(Continued)

OTHER PUBLICATIONS

Form PCT/ISA/237 (three (3) pages).

(Continued)

*Primary Examiner* — Ian Jen
(74) *Attorney, Agent, or Firm* — Crowell & Moring LLP

(57) ABSTRACT

A control device and method in which, even when a road deviation operation is performed continuously near a road boundary where sidewalk/road separating blocks are discontinuously lined up, discontinuity does not occur in the control input, and unwanted vehicle behavior does not occur. The sizes of obstacles present around a host vehicle, as well as their relative positions and relative speeds with respect to the host vehicle are detected. An obstacle link length that serves as a determination criterion for virtual linking of obstacles is set. A gap position interpolation process is performed with respect to the linked obstacles. A search is performed as to whether or not there exists a control subject for which collision is to be avoided. A yaw moment for avoiding an obstacle is calculated based on position information of the avoidance control subject.

16 Claims, 12 Drawing Sheets

(56) References Cited

U.S. PATENT DOCUMENTS

| | | | |
|---|---|---|---|
| 2004/0024498 A1* | 2/2004 | Okamura et al. | 701/1 |
| 2004/0252863 A1* | 12/2004 | Chang et al. | 382/104 |
| 2005/0165550 A1* | 7/2005 | Okada | 701/301 |
| 2007/0040705 A1* | 2/2007 | Yoshioka et al. | 340/988 |
| 2007/0073484 A1* | 3/2007 | Horibe | 701/301 |
| 2007/0225933 A1* | 9/2007 | Shimomura | 702/127 |
| 2008/0164985 A1* | 7/2008 | Iketani et al. | 340/435 |
| 2008/0186382 A1* | 8/2008 | Tauchi et al. | 348/148 |
| 2008/0300787 A1* | 12/2008 | Zeng | 701/301 |
| 2009/0135065 A1* | 5/2009 | Tsuchida et al. | 342/454 |

FOREIGN PATENT DOCUMENTS

| | | |
|---|---|---|
| JP | 2005-202678 A | 7/2005 |
| JP | 2005-209019 A | 8/2005 |
| JP | 2005-324782 A | 11/2005 |
| JP | 2005-326963 A | 11/2005 |
| JP | 2006-79346 A | 3/2006 |
| JP | 2009-086788 | 4/2009 |

OTHER PUBLICATIONS

International Search Report with English translation dated Jul. 20, 2010 (two (2) pages).

Japanese Notification of Reasons for Refusal with English translation thereof Dated Jun. 25, 2013 {Six (6) pages}.

Office Action of Japanese Application No. 2009-130706 and English translation.

* cited by examiner

VEHICLE CONTROL DEVICE AND VEHICLE CONTROL METHOD

TECHNICAL FIELD

The present invention is a vehicle control device and vehicle control method wherein, using an obstacle detection device mounted on a vehicle, a three-dimensional object within a travel area is detected and collision with that three-dimensional object is avoided.

BACKGROUND ART

Technical developments related to ASV (Advanced Safety Vehicle) wherein warnings are given to drivers and operation assistance is provided to ensure safe driving of vehicles have been underway. In particular, in order to prevent vehicles from deviating from roads, three-dimensional objects representing road boundaries, such as sidewalk/road separating blocks, guard rails, hedges, etc., or traffic lanes, etc., need to be detected, and the host vehicle needs to be controlled in accordance with the detection result. As for three-dimensional objects representing road boundaries, they are separated and lined up at various intervals as can be understood from the fact that, by way of example, there are those that are lined up at intervals that allow entry by vehicles, as in entrances to parking lots, or branch roads, and there are also those that are lined up at intervals that only allow entry by pedestrians.

In preventing deviation from roads, continuous deviation prevention control is performed with respect to separated three-dimensional objects. However, an arrangement needs to be made such that deviation prevention control is not performed when entering parking lots or branch roads.

With respect to boundary position detection, by way of example, there is disclosed in Patent Document 1 a technique for detecting a three-dimensional object representing a traffic lane or road boundary based on an image or distance measurement data (ranging data) obtained from a camera or laser scanner mounted on a vehicle.

In addition, with respect to deviation prevention control, by way of example, there is disclosed in Patent Document 2 a technique for preventing, where there is a possibility that the host vehicle might deviate from the traveled traffic lane, the host vehicle from deviating from the traveled traffic lane by imparting to the host vehicle a yaw moment by controlling the braking force on the wheels. In addition, by way of example, there is disclosed in Patent Document 3 a technique for preventing deviation from a road by adjusting the yaw moment imparted to the host vehicle in accordance with the position of an obstacle at the shoulder, such as a parked vehicle, etc., that exists in a travel area.

PRIOR ART DOCUMENTS

Patent Documents

Patent Document 1: JP Patent Application Publication No. 11-213138 A (1999)
Patent Document 2: JP Patent Application Publication No. 2000-33860 A
Patent Document 3: JP Patent Application Publication No. 2005-324782 A

SUMMARY OF THE INVENTION

Problems to be Solved by the Invention

With the related art mentioned above, a plurality of three-dimensional objects representing a road boundary and mutually separated in the travel direction are determined as being a single object. Thus, by way of example, if a continuous road deviation operation were to be performed near a road boundary where sidewalk/road separating blocks are discontinuously lined up, there would be concerns that discontinuity may occur, such as control input weakening, etc., at a gap portion of the sidewalk/road separating blocks. There is a problem in that, when discontinuity occurs in the control input, unwanted vehicle behavior occurs, leading to compromised safety, and increased discomfort with respect to operation assistance.

The present invention is made with a view to solving the problems mentioned above, and an object thereof is to provide a vehicle control device and vehicle control method that enable stable road deviation prevention by virtually linking obstacles with each other based on the relationship between a plurality of mutually separated obstacles and the host vehicle.

Means for Solving the Problems

With a view to solving the problems mentioned above, the present invention is a vehicle control device that controls vehicle behavior in such a manner that, when a host vehicle approaches an obstacle, the host vehicle does not come into contact with the obstacle, comprising: obstacle detection means that detects the size of an obstacle present around the host vehicle, as well as its relative position and relative speed with respect to the host vehicle; vehicle motion detection means that detects a motion state of the host vehicle; and obstacle virtual linking means that virtually links, and recognizes as one obstacle, a plurality of obstacles detected by the obstacle detection means, wherein the obstacle virtual linking means determines and executes the linking of the plurality of obstacles based on relative position and magnitude of relative speed.

In addition to the features above, the obstacle virtual linking means comprises obstacle link length setting means that sets an obstacle link length which serves as a determination criterion for linking obstacles with each other, wherein the linking of the plurality of obstacles is executed when a gap between the plurality of obstacles is shorter than the obstacle link length. Further, the obstacle virtual linking means comprises travel path estimation means that estimates a travel path of the host vehicle based on the motion state detected from the vehicle motion detection means, wherein a pair of obstacles to be virtually linked is selected in accordance with the estimated travel path and the relative positions of the obstacles detected by the obstacle detection means. Further, the obstacle virtual linking means selects, from each of a left area and a right area relative to the travel path, a pair comprising an obstacle that is further from the host vehicle than a predetermined distance and an obstacle that is closer than the predetermined distance, and virtually links them as a pair of obstacles.

It further comprises vehicle control determination means that calculates a yaw moment control amount required for avoiding an obstacle based on the relationship between the obstacle and the host vehicle obtained by the obstacle detection means and the obstacle virtual linking means, wherein, if the obstacle or the virtually linked obstacle is located within the predetermined distance from the host vehicle along the travel path, the vehicle control determination means determines the obstacle to be an avoidance control subject and calculates a yaw moment control amount required for avoiding the avoidance control subject.

In addition, it is a vehicle control method that controls vehicle behavior in such a manner that, when a host vehicle approaches an obstacle, the host vehicle does not come into contact with the obstacle, wherein the size of an obstacle that is present around the host vehicle, as well as its relative position and relative speed with respect to the host vehicle are detected, a motion state of the host vehicle is detected, a detected plurality of obstacles are virtually linked and recognized as one obstacle, and the linking of the plurality of obstacles is determined and executed based on the detected relative position and the magnitude of the relative speed.

Effects of the Invention

With respect to obstacles lined up and separated at varying intervals, by performing, as deemed appropriate, the possibility of virtually linking two obstacles based on their relationship with the host vehicle, it is possible to, with respect to road deviation prevention control, prevent discontinuity from occurring in the control input to cause unstable vehicle behavior, and to realize stable and comfortable driving.

MODES FOR CARRYING OUT THE INVENTION

Best modes for carrying out the present invention are described below based on the drawings. However, the present invention may be carried out in numerous and varying embodiments, and is not to be construed as being limited to the disclosure of the present modes.

EMBODIMENTS

Figure 1:
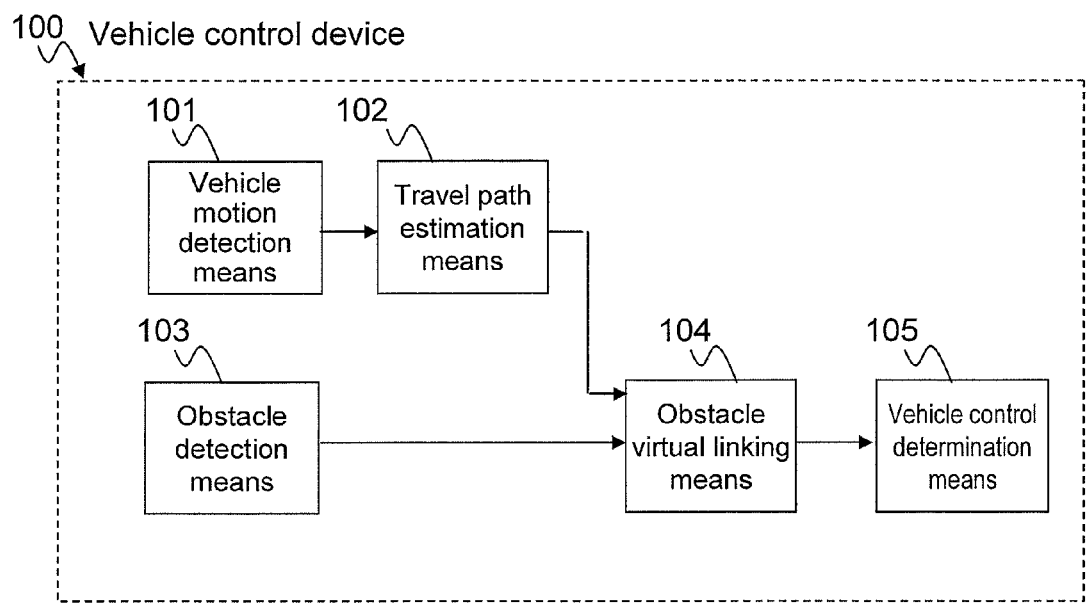
FIG. 1 shows a block configuration of a vehicle control device according to an embodiment.

Embodiments of the present invention are described in detail below with reference to the drawings.
FIG. 1 shows a block configuration of a vehicle control device according to the present invention. A vehicle control device 100 comprises a vehicle motion detection means 101, which detects the motion state of the host vehicle, and a travel path estimation means 102, which estimates a travel path based on the detected motion state. In addition, it comprises an obstacle detection means 103, which detects the position, speed and size of obstacles around the host vehicle. It further comprises an obstacle virtual linking means 104, which virtually links separated obstacles detected by the obstacle detection means 103 with each other based on the travel path estimated by the travel path estimation means 102, and a vehicle control determination means 105, which determines a control amount required to avoid obstacles based on the obtained positions of the obstacles.

Next, the vehicle motion detection means 101 and the travel path estimation means 102 will be described. The vehicle motion detection means 101 is a means that detects a physical quantity related to vehicle motion. It comprises wheel speed sensors, which detect rotation speeds $\omega_i$ (i=fl, fr, rl, rr) of the four wheels at the front/rear/left/right of the host vehicle, and a steering angle sensor, which detects steering angle $\delta$ of the steering wheel. It is noted that $\omega_{fl}$ indicates the rotation speed of the front wheel on the left, $\omega_{fr}$ the rotation speed of the front wheel on the right, $\omega_{rl}$ the rotation speed of the rear wheel on the left, and $\omega_{rr}$ the rotation speed of the rear wheel on the left.

In addition, turning signal indicators that detect a turning signal operation by the driver are also included. The use of Equation 1 or Equation 2 below is favorable for calculating vehicle speed V of the host vehicle. It is noted that the tire radius is denoted rw.

In the case of front-wheel drive,

[Eq. 1]

$$V = rw \frac{\omega_{rl} + \omega_{rr}}{2} \qquad (1)$$

In the case of rear-wheel drive,

[Eq. 2]

$$V = rw \frac{\omega_{fl} + \omega_{fr}}{2} \qquad (2)$$

The travel path estimation means 102 is a means that estimates a travel path based on the motion state obtained from the vehicle motion detection means 101. In the present case, it performs estimation in accordance with a vehicle motion model based on steering angle $\delta$ and vehicle speed V obtained from the vehicle motion detection means 101.

It is assumed that the zone for estimating a travel path is within the detection range of the scanning range finder. A travel path point that is separated from the host vehicle by distance Lg is taken to be the front gaze position, and distance Lg the front gaze distance. The front gaze position is a position that is used in making determinations in the control for preventing road deviation of the host vehicle, which will be discussed in detail later, and is calculated through Equations 3 and 4 below, for example.

[Eq. 3]
$$Xp = V \cdot \sin\Phi \cdot T \quad (3)$$

[Eq. 4]
$$Zp = V \cdot \cos\Phi \cdot T \quad (4)$$

[Eq. 5]
$$\Phi = r \cdot T \quad (5)$$

[Eq. 6]
$$r = \left( \frac{l}{l - \frac{m}{2l^2} \frac{l_f \cdot K_f - l_r \cdot K_r}{K_f \cdot K_r}} \right) \cdot \frac{V}{l \cdot n} \cdot \delta \quad (6)$$

Figure 4:
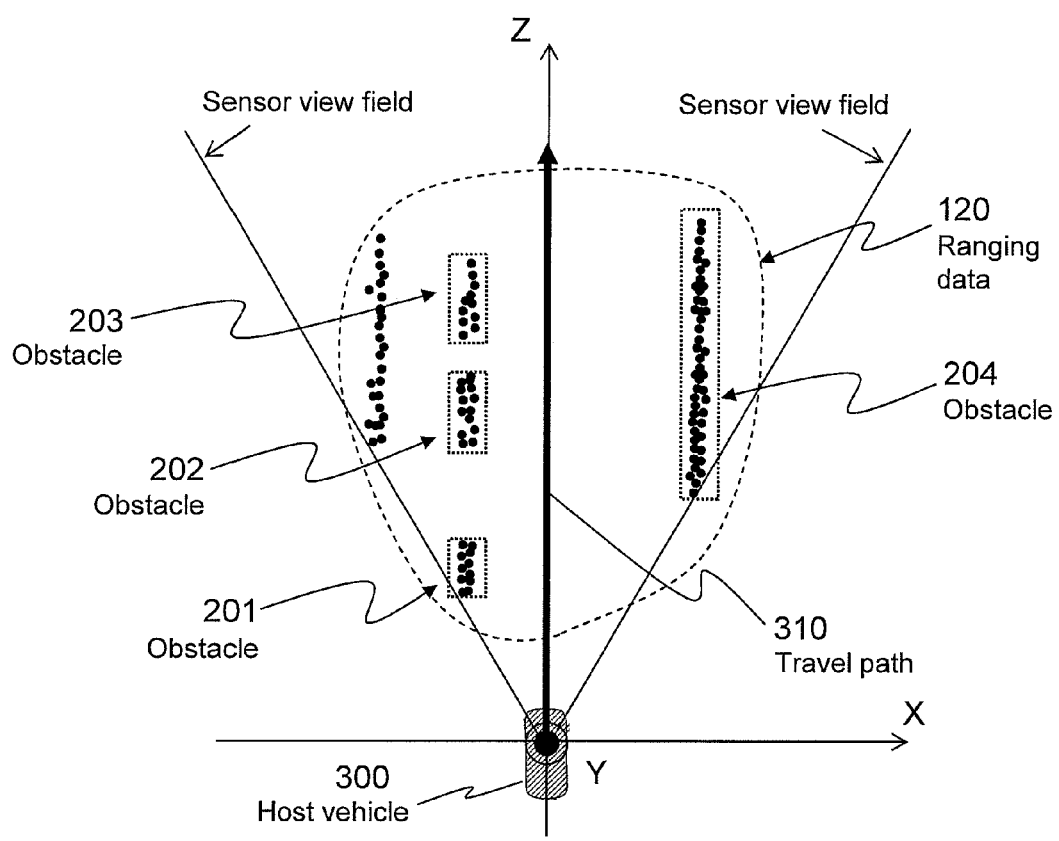
FIG. 4 shows a distribution of ranging data of obstacles obtained from a scanning range finder when the travel scene in FIG. 3 is traveled.

Here, Xp is the X-coordinate value of the front gaze position, and Zp the Z-coordinate value of the front gaze position. Here, as shown in FIG. 4, the coordinate system is a vehicle coordinate system where the center of gravity of a host vehicle 300 is taken to be the origin, the travel direction of the host vehicle 300 the Z-axis, the car width direction the X-axis, and the height direction the Y-axis. In addition, T is the forward gaze time, which is determined experimentally, and is typically set to a value of 1.0 to 3.0 [sec]. $\Phi$ is the yaw angle of the host vehicle after the forward gaze time, and is calculated through Equation 5. r is the yaw rate and is calculated through Equation 6 based on vehicle speed V and steering angle $\delta$. It is noted that, with respect to Equation 6, m is the weight of the host vehicle, l the wheel base, $l_f$ the length from the center of gravity of the vehicle to the front axle, $l_r$ the length from the center of gravity of the vehicle to the rear axle, $K_f$ the front wheel cornering power, $K_r$ the rear wheel cornering power, and n the steering ratio. These values are stored in memory.

Figure 2:
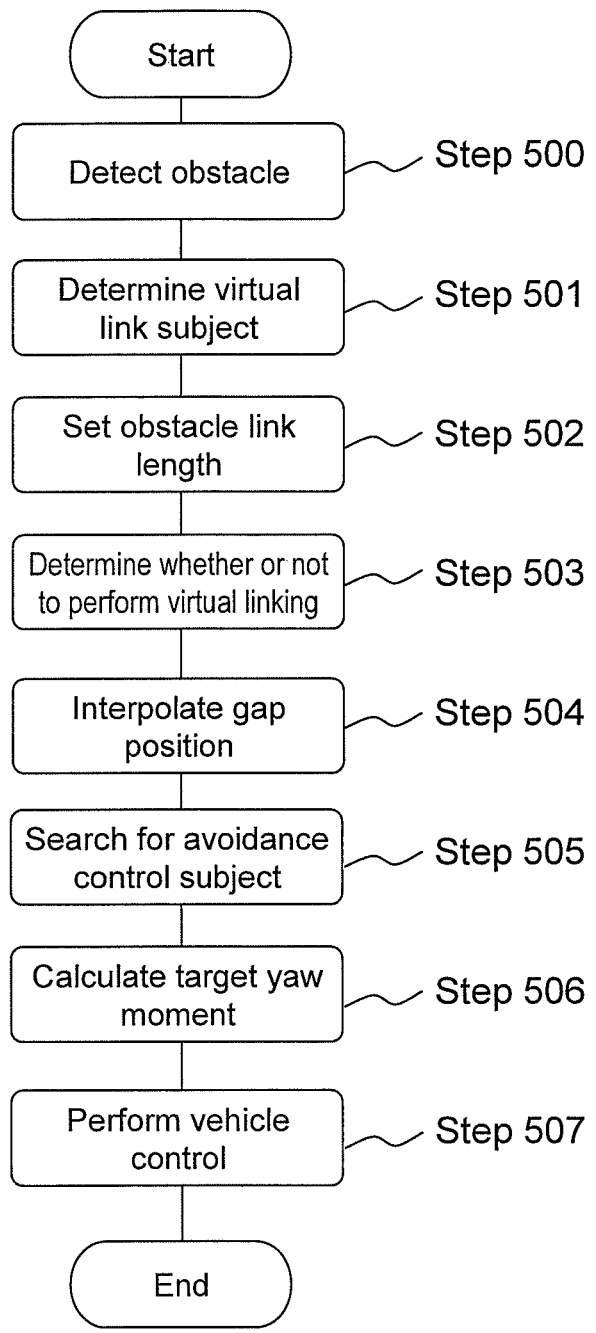
FIG. 2 shows a flowchart of a vehicle control method according to an embodiment.

Next, the obstacle detection means 103, the obstacle virtual linking means 104, and the vehicle control determination means 105 will be described in accordance with the process flow of the embodiment shown in FIG. 2.

The obstacle detection in process step 500 is performed by the obstacle detection means 103. Based on ranging data obtained from the scanning range finder installed on the host vehicle, the obstacle detection means 103 detects the relative positions, relative speeds, and sizes of three-dimensional obstacles that are located near the road boundary. These three-dimensional objects located at the road boundary may be installed objects, such as sidewalk/road separating blocks, guard rails, walls, signs, traffic signal posts, etc., and, further, parked vehicles, etc.

In addition, for the scanning range finder, such sensors as image sensors, TOF (Time of Flight) laser scanners, millimeter-wave radars, ultrasonic sensors, etc., are typically used. Image sensors are typically used in a configuration comprising two or more synchronized units, where an environment within images of overlapping view fields is ranged based on the principles of triangulation. By way of example, stereo image sensors comprising two image sensors are typically and often used.

For image sensors and laser scanners, light receiving elements that are sensitive to short wavelength ranges, such as CCD, CMOS, etc., are used, and they are characterized in that they have higher spatial resolution relative to millimeter-wave radars and ultrasonic sensors. Therefore, in the case of detecting three-dimensional objects at road boundaries for which complex forms are anticipated, it is preferable that laser scanners and image sensors comprising two or more units be used.

Figure 3:
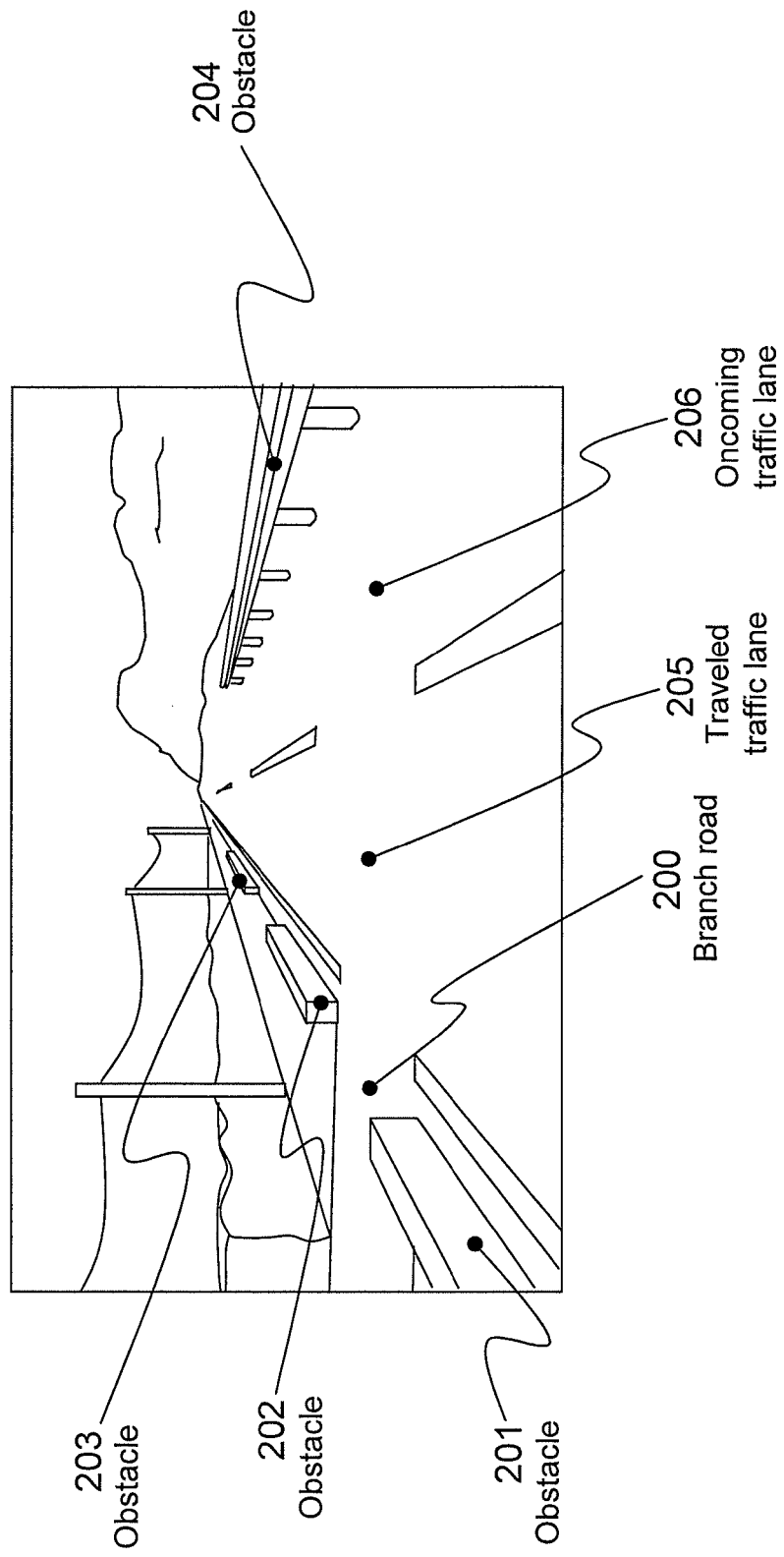
FIG. 3 shows an example of a travel scene to which a device or method according to an embodiment is applied.

FIG. 3 and FIG. 4 show an example where obstacles are detected by the obstacle detection means 103. Stereo image sensors are used as the scanning range finder. FIG. 3 is an image of a traveled path as taken by the stereo image sensors installed on the inner side of the front window of the host vehicle. The host vehicle is traveling a straight path on the left side of a road comprising two traffic lanes, namely, a traveled traffic lane 205 and an oncoming traffic lane 206. Obstacles 201, 202 and 203, which are sidewalk/road separating blocks, are installed, in a mutually separated manner, at the road boundary of the travelled traffic lane 205. In addition, an obstacle 204, which is a guard rail, is installed at the road boundary of the oncoming traffic lane 206. There is a leftward branch road 200 between the obstacle 201 and the obstacle 202.

FIG. 4 shows an obstacle detection result detected by the scanning range finder with respect to a case where the host vehicle is travelling forward along the traveled traffic lane 205. In FIG. 4, the black dots are ranging data 120 and represent ranged positions of obstacles obtained from the scanning range finder. The bold arrow represents a travel path 310 of the host vehicle 300 as estimated by the travel path estimation means 102. The black dots enclosed by the dotted squires are ranging data 120 and represent detected obstacles. Here, it is indicated that the obstacles 201, 202 and 203 are present on the left side of the travel path 310, and the obstacle 204 is present on the right side.

The relative position and size of an obstacle may be estimated based on the distribution form of the ranging data 120. Since the scanning range finder outputs ranging data every pre-defined sampling time $\Delta t$, relative speed may be estimated based on the relative position of the obstacle detected before sampling time $\Delta t$. In addition to the "relative position," "relative speed," and "size" of a detected obstacle, its "ID number," "virtual linkee ID number," "virtual link determination method type," "virtual link position," and "interpolation model parameter" are stored as attribute data. The attribute data is stored in the memory that the vehicle control device is equipped with, and is loaded as required. The attribute data is held until the relevant obstacle disappears from the view field of the scanning range finder, or for a predetermined period from when the obstacle is detected.

It is noted that since the present invention is by no means limited by the scanning range finder type, the scanning range finder type may be any type so long as the sensor is capable of detecting obstacles in the traveled environment. Obstacles are thus detected in step 500.

Next, in step 501 through step 505, a series of processes for virtual linking is performed. These processes are performed by the obstacle virtual linking means 104. First, in step 501, a determination of virtual link subjects for performing virtual linking is made. For this method of determining link subjects, there are the following two methods.

The first method is a method where, with respect to obstacles located in the left and right areas of a travel path, a pair of obstacles that are respectively located, in a separated manner, on a near side and a far side relative to the forward gaze distance is taken to be virtual link subjects. Thus, the virtual linking of a plurality of obstacles lined up along the travel direction becomes possible. Even if the host vehicle were to suddenly change its travel direction, since the misalignment amount of the forward gaze position relative to the virtually linked area is detectable, deviation prevention control becomes possible. It is noted that misalignment amount and deviation prevention control will be described in connection with the vehicle control determination means 105 which is discussed later.

The second method is a method where, with respect to obstacles located in the left and right areas of a travel path, a pair comprising an obstacle in the left area and an obstacle in the right area, which are located further than the forward gaze distance and for which the inter-obstacle gap relative with respect to the travel path is shortest, is taken to be virtual link subjects. Here, if there are a plurality of pairs with narrow gaps, the pair closest to the host vehicle is taken to be the subjects. Thus, the virtual linking of obstacles disposed in the travel direction and at an interval that is difficult to pass through becomes possible. Since the misalignment amount of the forward gaze position relative to the virtually linked area is detectable, deviation prevention control becomes possible.

With respect to the two methods above, gaps between obstacles may be calculated by searching for, from among all combinations of ranging data belonging to the respective obstacles, a combination of ranging data that gives the shortest distance. The ranging data combination thus derived is stored in memory for later use in interpolating the gap position in step 504.

Figure 5:
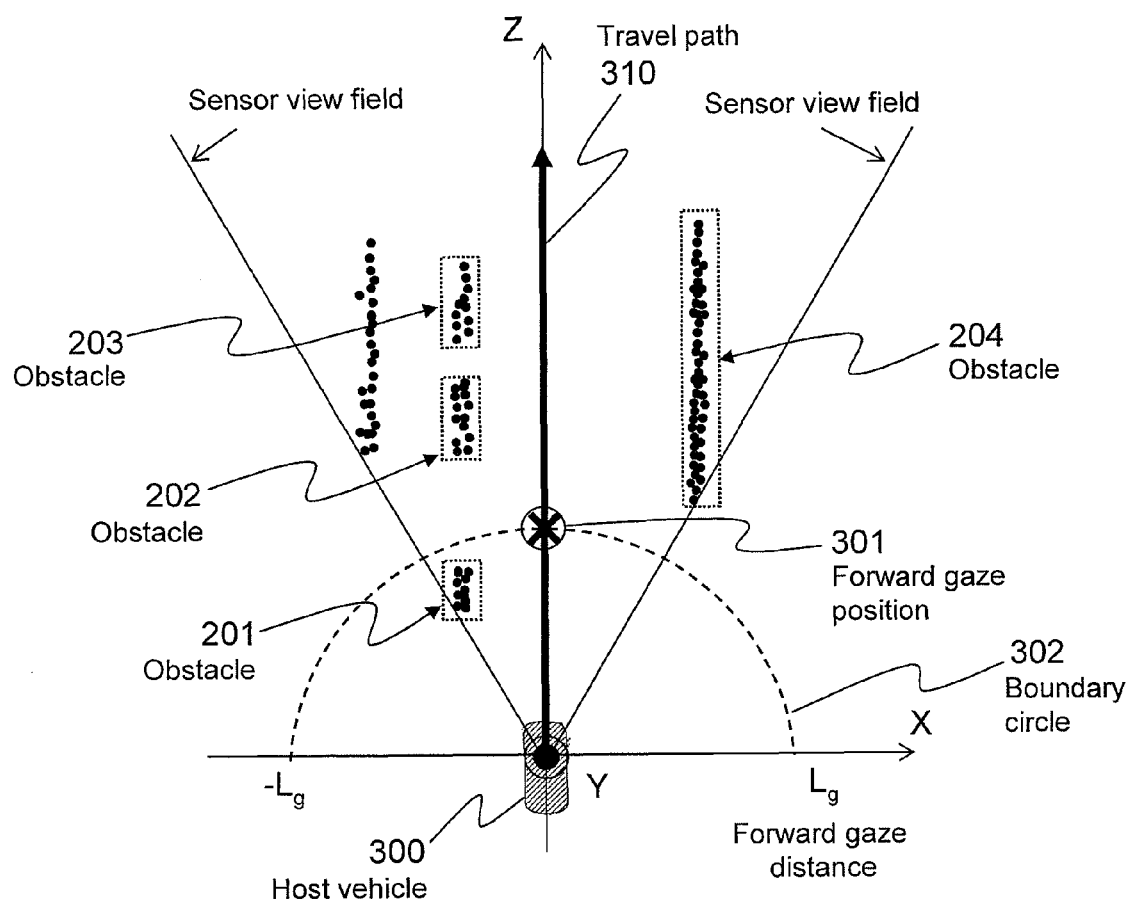
FIG. 5 shows a determination example for virtual link subjects when traveling straight in the travelled traffic lane with respect to the travel scene in FIG. 3.
Figure 6:
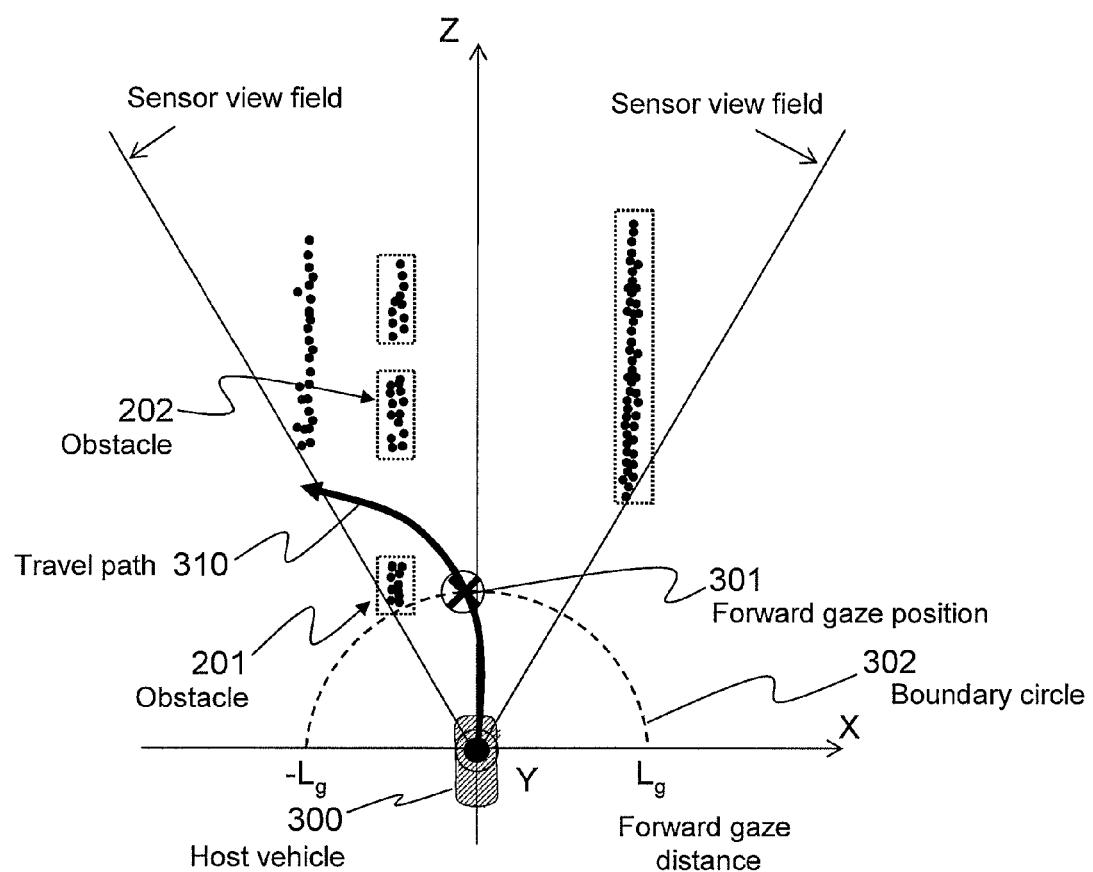
FIG. 6 shows a determination example for virtual link subjects when turning towards the branch road in the travel scene in FIG. 3.

FIG. 5 and FIG. 6 show examples of the above-discussed determination of virtual link subjects. FIG. 5 shows an obstacle detection result for a case where the host vehicle 300 is traveling forward in the traveled traffic lane 205. The obstacle 201, which is located on the inside of a boundary circle 302 whose radius is the forward gaze distance Lg in the figure, and the obstacle 202, which is located on the outside, become virtual link subjects on the left side of the travel path 310 according to the first method. There are no virtual link subjects on the right side of the travel path 310 according to the first method. In addition, on the outside of the boundary circle 302, the obstacle 202 and the obstacle 204, which are a pair of obstacles with the shortest gap with respect to the travel path 310, become virtual link subjects according to the second method.

FIG. 6, as indicated by the left-turning travel path 310, shows an obstacle detection result for a case where the host vehicle 300 turns left from the traveled traffic lane 205 towards the branch road 200. Here, since there are no obstacles on the inside of the boundary circle 302 whose radius is the forward gaze distance Lg, there are no virtual link subjects according to the first method. In addition, on the outside of the boundary circle 302, the obstacle 201 and the obstacle 202, which are a pair of obstacles with the shortest distance with respect to the travel path 310, become virtual ink subjects according to the second method.

As demonstrated through the two examples above, in step 501, virtual link subjects are set through two methods. It is noted that, when selected as virtual link subjects, the pairs of ranging data stored in memory and used in calculating the shortest distance between obstacles are stored under the item "virtual link position" of the attribute data for the respective obstacles. The process of step 501 is thus concluded.

Next, obstacle link length Lth with respect to the obstacles of the pair selected as virtual link subjects is determined in step 502. Obstacle link length Lth is set based on the relationship between the host vehicle and the obstacles. The setting method thereof will be described using an example where the road shown in FIG. 3 is traveled.

By way of example, if, due to an erroneous handle maneuver by the driver while traveling at a high speed, the host vehicle were to turn towards the branch road 200, it is preferable that the obstacle 201 and the obstacle 202 be virtually linked and obstacle avoidance control be performed before the host vehicle enters the branch road 200. In contrast, if the host vehicle were to turn towards the branch road 200 due to a handle maneuver by the driver while traveling at a low speed, it is preferable that the obstacle 201 and the obstacle 202 not be virtually linked so as not to obstruct entry by the host vehicle. As in the examples above, in the determination for virtually linking separated obstacles, relative speed Vr between the vehicle and the obstacle becomes important. As such, it is preferable that obstacle link length Lth be set in accordance with relative speed Vr between the vehicle and the obstacle. Specifically, it is preferable that it be determined in accordance with Equation 7 below.

[Eq. 7]

$$Lth = f(Vr) \qquad \text{Equation (7)}$$

Here, function f is an increasing function with respect to speed.

Figure 7:
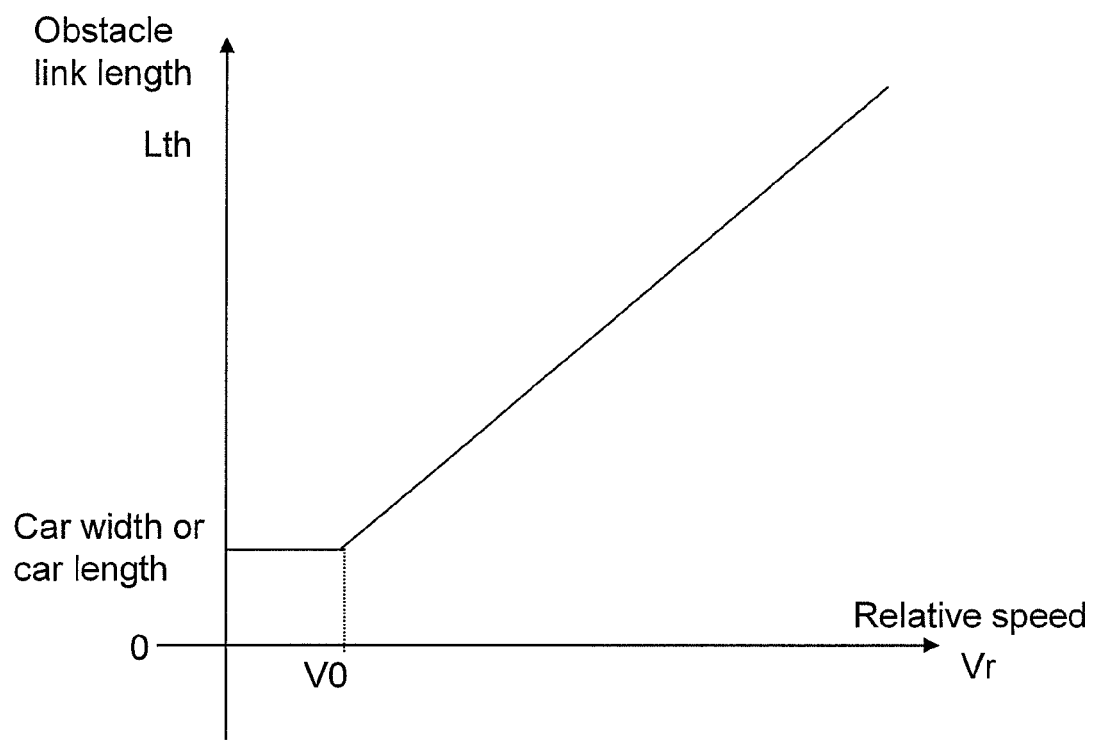
FIG. 7 shows an example of a function that gives obstacle link length with respect to relative speed.

FIG. 7 is an example of a function that gives obstacle link length with respect to relative speed. Here, assuming the minimum of obstacle link length Lth is the car width or car length of the host vehicle and assuming a case of predetermined speed $V_0$ or greater, obstacle link length Lth is made longer in a linear fashion in accordance with relative speed Vr.

In addition, besides relative speed, obstacle link length Lth may also be determined in accordance with angle α formed between the arrangement of separated obstacles and the travel path of the host vehicle. By way of example, if a gap between separated obstacles is to be passed through straight, that is, if angle α is π/2, obstacle link length Lth is made to be a length corresponding to the car width, while making it be a length corresponding to the car length as angle α decreases. Assuming the car width of the host vehicle is d and its car length lw, the use of Equation 8 would be favorable, for example. Here, Δd and Δlw represent margins with respect to the car width and car length, respectively.

[Eq. 8]

$$L_{th} = (l_w + \Delta l_w)\sin\alpha + (d + \Delta d)\cos\alpha \qquad \text{Equation (8)}$$

In addition, obstacle link length Lth may also be determined using both relative speed Vr and angle α. By way of example, it would be favorable to use Equation 9.

[Eq. 9]

$$L_{th} = \beta \cdot [(l_w + \Delta l_w)\sin\alpha + (d + \Delta d)\cos\alpha] + (1-\beta)f(Vr) \qquad \text{Equation (9)}$$

where $\beta = (2/\pi)\alpha$.

When angle α is sufficiently small relative to π/2, the obstacle link length commensurate with the relative speed is given priority. When angle α is close to π/2, the obstacle link length commensurate with the angle formed between two obstacles and the travel path is given priority. In addition, it is preferable that obstacle link length Lth be calculated based on the greater of the values for relative speed Vr with respect to the two obstacles.

With respect to the virtual link subjects determined in step 501, obstacle link length Lth with respect to the virtual link subjects according to the first method may be determined using Equation 7. In addition, it is preferable that obstacle link length Lth with respect to the virtual link subjects according to the second method be determined using Equation 8 or Equation 9. It is noted that the setting of obstacle link length Lth is not limited to the method mentioned above, and may instead be set by other methods. The setting of the virtual link length in step 502 is thus concluded.

Next, in step 503, with respect to all the virtual link subjects determined in step 501, a determination on carrying out virtual linking is sequentially performed based on obstacle link length Lth determined in step 502. If the gap between two obstacles that are virtual link subjects is shorter than obstacle link length Lth, a determination is made to perform a virtual linking process. On the other hand, if the gap between two obstacles is longer than obstacle link length Lth, it is determined that virtual linking is not to be performed.

Figure 8:
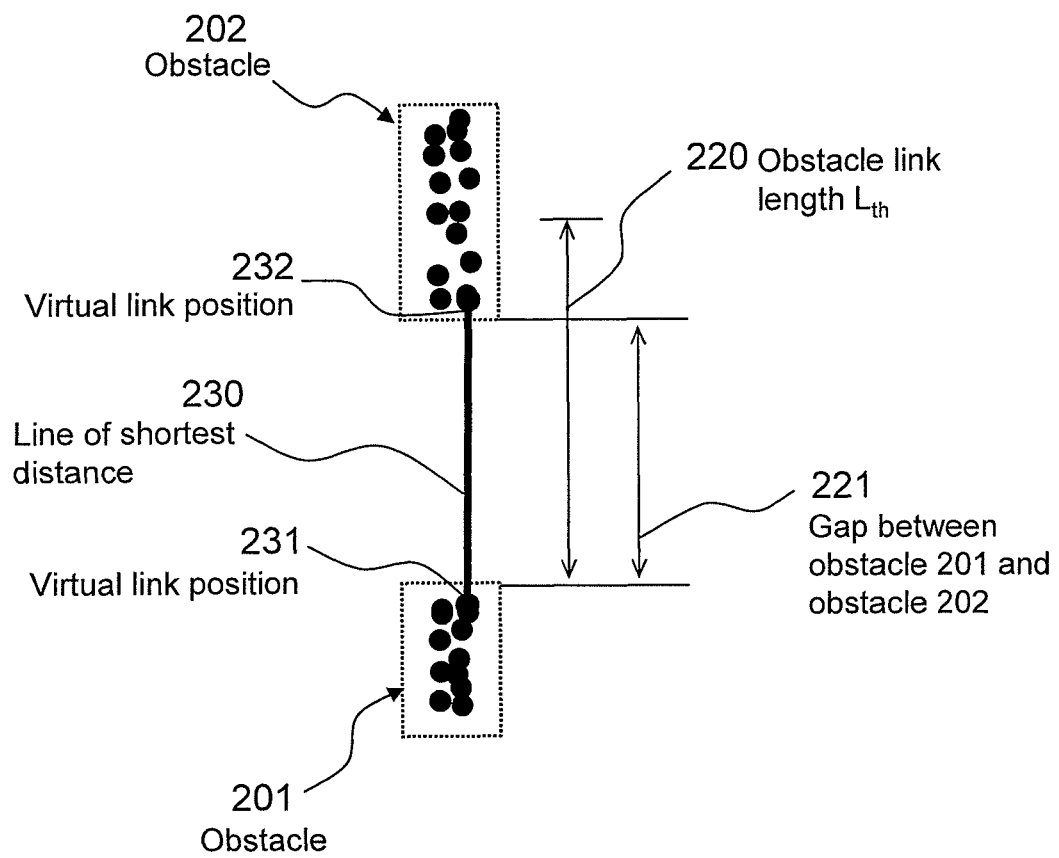
FIG. 8 shows an enlarged view of virtual link subjects selected through a first method with respect to FIG. 5.
Figure 9:
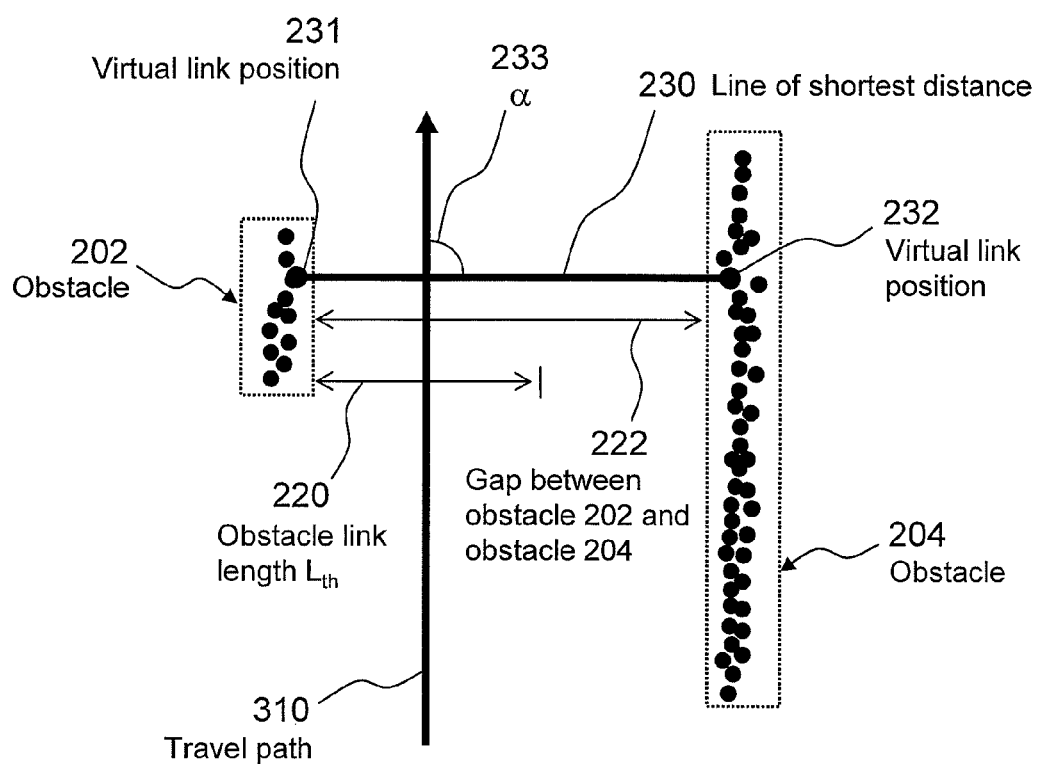
FIG. 9 shows an enlarged view of virtual link subjects selected through a second method with respect to FIG. 5.

Using FIG. 8, FIG. 9, and FIG. 10, examples of procedures for determining whether or not to perform virtual linking will be described. FIG. 8 is a figure showing, in an enlarged manner, virtual link subjects determined by the first method and that are located in the left area of the travel path 310 in FIG. 5. The obstacle 201 and the obstacle 202 are virtual link subjects. Obstacle link length Lth with respect to these two obstacles may be calculated by means of a function (relation) of obstacle link length Lth with respect to relative speed Vr such as that shown in FIG. 7. As shown in FIG. 8, since determined obstacle link length 220 is longer than gap 221 of the two obstacles, in such a case, it is determined that these two obstacles are to be virtually linked.

Next, an example of a link determination for virtual link subjects determined by the second method will be described. FIG. 9 shows, in an enlarged manner, the obstacle 202 and the obstacle 204 which are virtual link subjects determined by the second method. Obstacle link length Lth is calculated based on Equation 9 using angle α233 formed between the travel path 310 and line 230 of the shortest distance connecting virtual link position 231 of the obstacle 202 and virtual link position 232 of the obstacle 204, and relative speed Vr. As shown in FIG. 9, since calculated obstacle link length 220 is shorter than gap 222 between the two obstacles, it is determined that linking is not to be performed with respect to these two obstacles.

Figure 10:
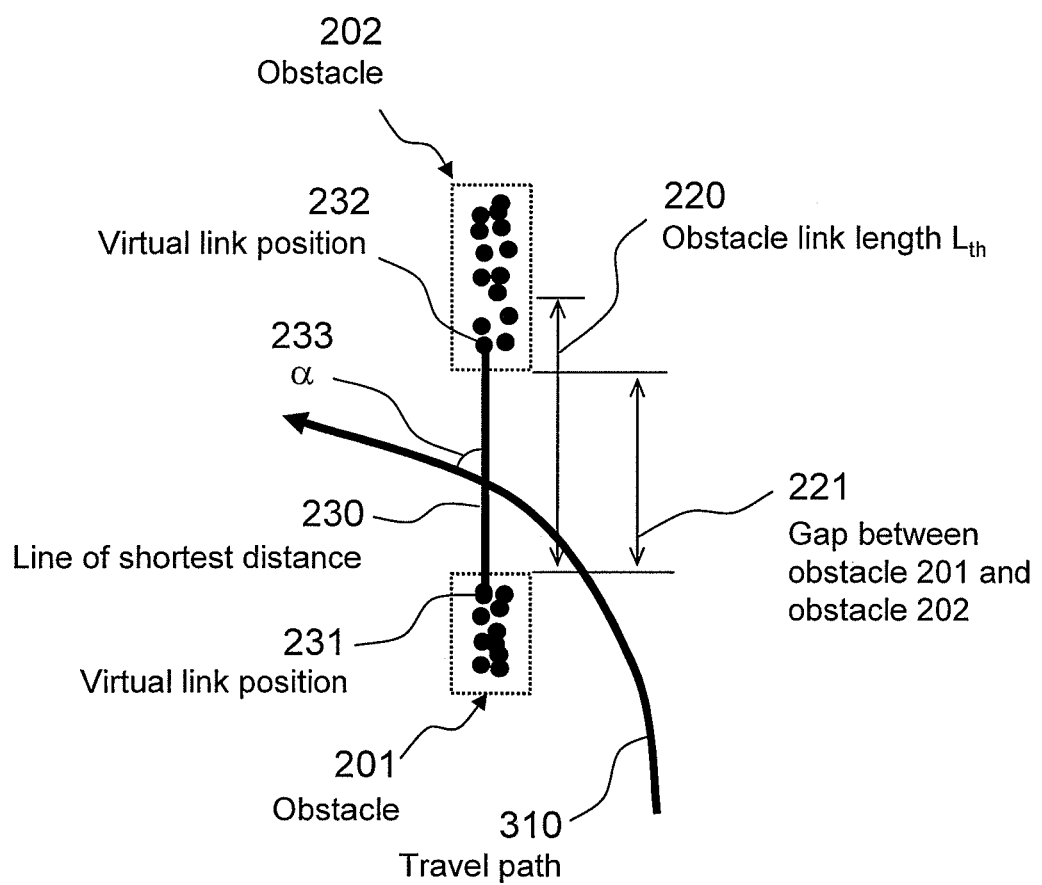
FIG. 10 shows, in an enlarged manner, an example where the host vehicle turns towards virtual link subjects determined through the first method with respect to FIG. 6.

FIG. 10 shows, in an enlarged manner, an example where the host vehicle turns towards virtual link subjects determined by the first method with respect to FIG. 6. Here, the obstacle 201 and the obstacle 202 are virtual link subjects. Obstacle link length Lth is calculated based on Equation 9 using angle α233 formed between the travel path 310 and line 230 of the shortest distance connecting virtual link position 232 of the obstacle 201 and virtual link position 231 of the obstacle 202, and relative speed Vr. In the example shown in FIG. 10, since calculated obstacle link length 220 is longer than gap 221 between the two obstacles, it is determined that these two obstacles are to be virtually linked.

As demonstrated through the three examples above, a determination as to whether or not virtual linking is to be performed is made in step 503. It is noted that the ID number of the other obstacle is stored under the item "virtual linkee ID number" of the attribute data of the two obstacles for which it has been determined that virtual linking is to be performed. In addition, which of the first and second methods it has been determined that virtual linking is to be performed by is stored under the item "virtual link determination method type" of the attribute data. The process in step 503 is thus concluded.

Next, in step 504, a gap position interpolation process is performed with respect to the pair comprising the two obstacles for which it has been determined in step 503 that virtual linking is to be performed. With respect to the method of interpolation, it is preferable that linear interpolation be performed using the pair of ranging data stored under the item "virtual link position" of the attribute data of the respective obstacles stored in memory. By way of example, in FIG. 8, interpolation line 230 is derived through linear interpolation based on virtual link position 231 of the obstacle 201 and virtual link position 232 of the obstacle 202. Parameters of the derived interpolation line are stored under "interpolation model parameter" of the attribute data. The parameters are used in the avoidance control subject search in step 505.

Thus, it is possible to virtually link separated obstacles by means of the obstacle virtual linking means 104 in accordance with the travel state of the host vehicle. It is noted that the obstacles virtually linked by the obstacle virtual linking means 104 and the obstacles detected by the obstacle detection means 103 are tracked by estimating their positions after sampling time Δt based on the measured relative positions and relative speeds. It is preferable that obstacles that have been virtually linked in the past be tracked with the virtually linked state sustained. In particular, since obstacles virtually linked by the first method are located at positions near the front gaze position, it is preferable that, once virtually linked, it not be cancelled. In addition, it is preferable that obstacles virtually linked by the second method be cancelled only when it is subsequently determined that virtual linking is not to be performed by the second method.

Next, in step 505, a search is performed as to whether or not there exists a control subject for which collision is to be avoided. The processes of this step 505, and of subsequent step 506 and step 507, are executed at the vehicle control determination means 105. The avoidance control subject search in step 505 is performed every sampling period Δt, and a search is performed based on the items "relative position," "size," and "gradient" of the attribute data of the obstacles stored in memory, and on the forward gaze position. The located area of an obstacle is derived based on "relative position," "size," and "gradient." If the forward gaze position falls within a predetermined range of this located area, this obstacle is taken to be an avoidance control subject. It is noted that if an ID number is stored under the item "virtual linkee ID number" of the attribute data, a search is performed with the attribute data of the virtual linkee included as well. If virtually linked, a position between the obstacles is taken into consideration as an area where an obstacle is located using "interpolation model parameter."

Next, in step 506, based on the position information of the avoidance control subject found in step 505, target yaw moment $M_r$ for avoiding the obstacle is generated. Equation 10 is an example of an equation for calculating this target yaw moment $M_r$.

[Eq. 10]

$$M_r = \begin{cases} K_1 \cdot \varepsilon + K_2 \cdot \dfrac{d\varepsilon}{dt} & (\varepsilon > 0) \\ 0 & (\varepsilon < 0) \end{cases}$$

Equation (10)

Here, $K_1$ and $K_2$ represent control gain, and $\varepsilon$ the misalignment amount between the located area of an obstacle and the forward gaze position. It is noted that misalignment amount $\varepsilon$ is positive when the forward gaze position goes beyond the obstacle, and a yaw moment is generated only when misalignment amount $\varepsilon$ is positive. In addition, with respect to the yaw moment, it is assumed that the anticlockwise direction is positive.

Finally, in step 507, vehicle control is performed based on the target yaw moment generated in step 506. In order to generate a yaw moment with respect to the vehicle, by way of example, there may be provided a braking device that is capable of independently controlling the braking forces on the left and right wheels of the front and rear wheels. The braking device may also be a brake that utilizes fluid pressure, or a brake that electrically causes a braking action. In addition, a yaw moment may also be generated by adjusting the rotation of the steering shaft.

Figure 11:
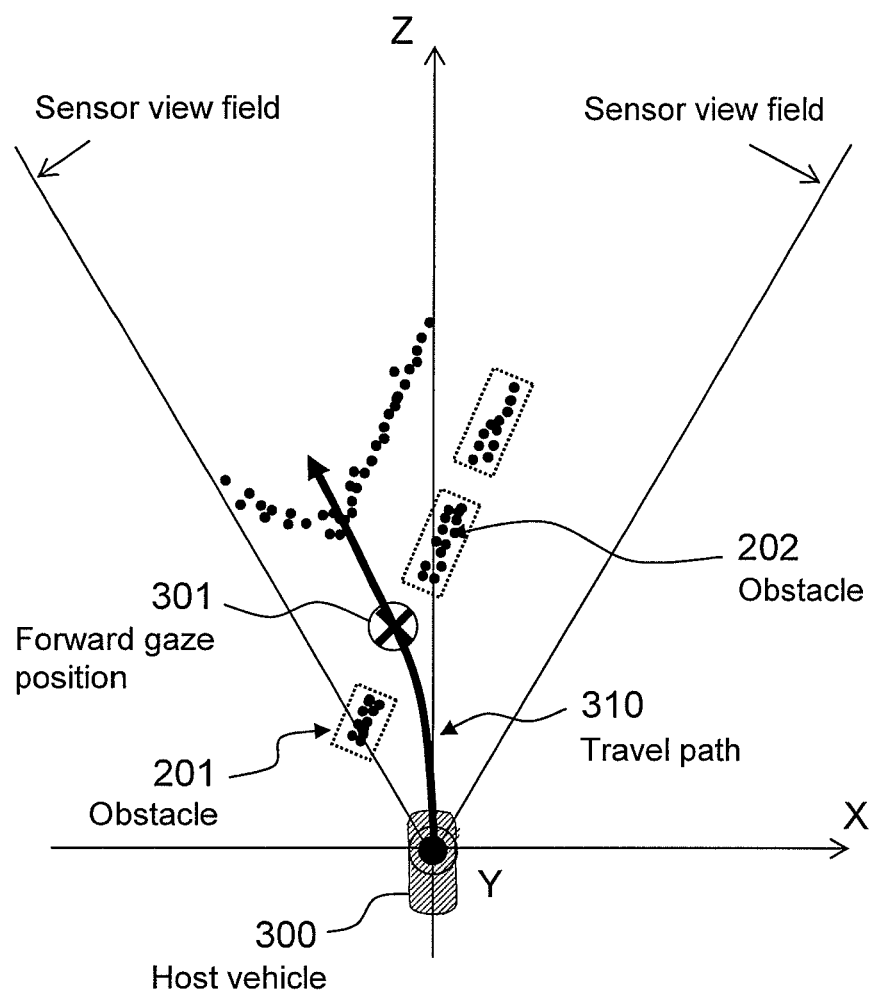
FIG. 11 shows a distribution of ranging data in a case where one proceeds from the host vehicle position towards a branch road on the left.
Figure 12:
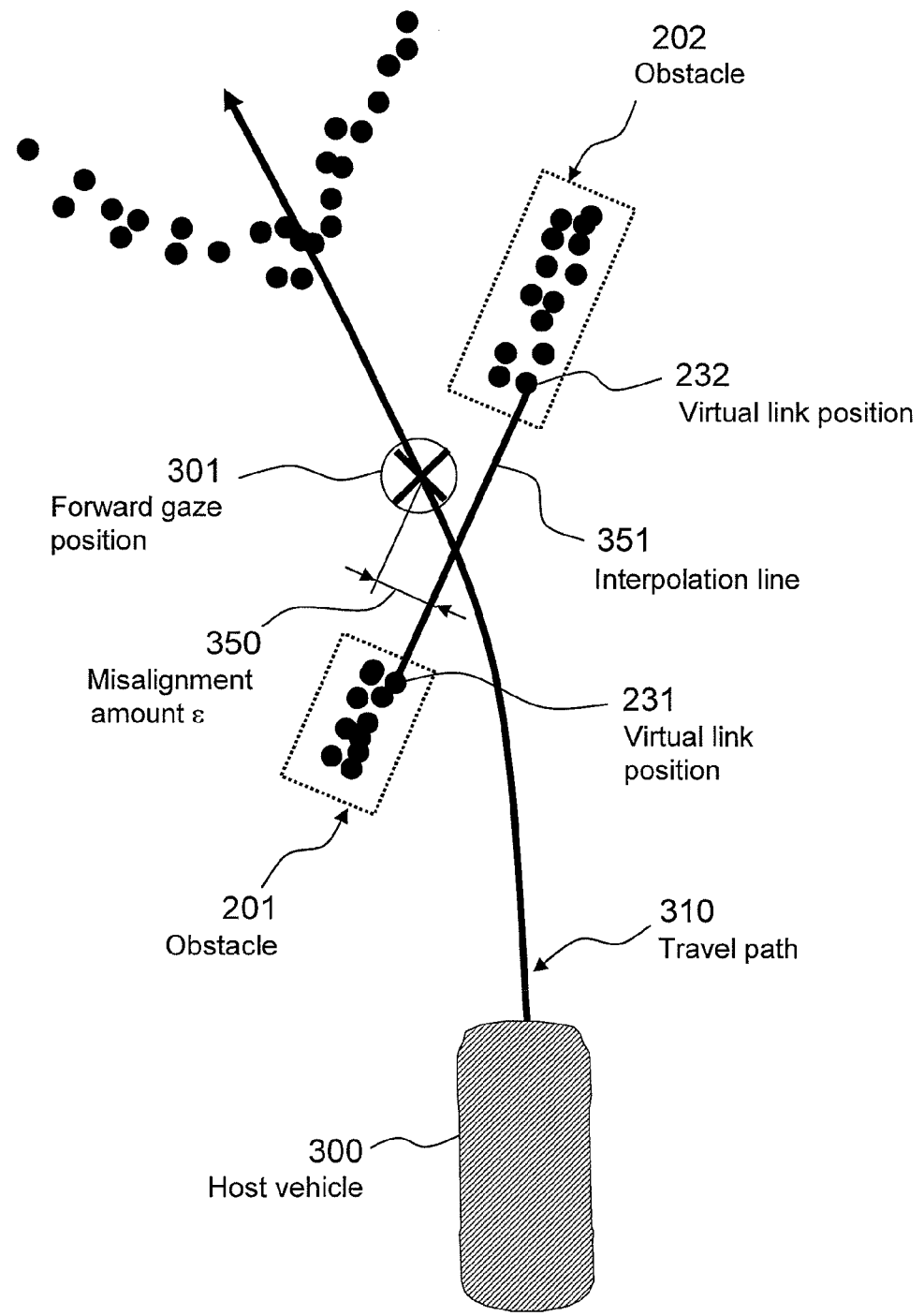
FIG. 12 shows, in an enlarged manner, the vicinity of forward gaze position 301 shown in FIG. 11 and misalignment amount $\epsilon$.

FIG. 11 and FIG. 12 show an example where vehicle control is performed. FIG. 11 shows a distribution of ranging data with respect to a case where one proceeds towards the branch road on the left from the host vehicle position 300. FIG. 12 shows, in an enlarged manner, the vicinity of the forward gaze position 301 shown in FIG. 11. The obstacle 201 and the obstacle 202 are a pair of virtually linked obstacles that have been found as avoidance control subjects in step 505. It is assumed that interpolation line 351 has been derived through the gap position interpolation process in step 504.

As shown in FIG. 12, since the forward gaze position 301 is at a position beyond interpolation line 351 from the host vehicle 300, misalignment amount ϵ 350 assumes a positive value. As a result, a target yaw moment is calculated through Equation 10 in step 506. In step 507, vehicle control for avoiding the virtually linked obstacles is executed based on this calculated target yaw moment.

The processes above from step 500 to step 507 are repeatedly executed at sampling period Δt, and control for avoiding collision with obstacles is realized.

Embodiments of the present invention have been described above. However, modes for carrying out the present invention are by no means limited to the embodiments discussed above, and various modified embodiments are possible. By way of example, if a blinker instruction is, given by the driver, priority may be accorded to the intention of the driver such that virtual linking is not performed. In addition, entry by the host vehicle may be obstructed regardless of vehicle speed by virtually linking obstacles based on entrance position information for roads that bar entry by vehicles, such as one-way exits, entrances to pedestrian roads, etc., obtained from a navigation system installed on the host vehicle.

In addition, with respect to the calculation of misalignment amount ϵ, the control timing for obstacle avoidance control of the host vehicle may be quickened by performing calculations based not on the located area of the obstacle, but instead on a position that is closer to the host vehicle from the obstacle by a predetermined length. In this case, obstacle avoidance control that takes the displacement of the obstacle into account becomes possible by lengthening/shortening the above-mentioned predetermined length depending on the relative speed of the obstacle, for example.

LIST OF REFERENCE NUMERALS

100: vehicle control device,
101: vehicle motion detection means,
102: travel path estimation means,
103: obstacle detection means,
104: obstacle virtual linking means,
105: vehicle control determination means,
120: ranging data,
200: branch road,
201-204: obstacle,
205: traveled traffic lane,
206: oncoming traffic lane,
220: obstacle link length $L_{th}$,
221: gap between obstacle 201 and obstacle 202,
222: gap between obstacle 202 and obstacle 204,
230: line of shortest distance,
231, 232: virtual link position,
300: host vehicle,
301: forward gaze position,
302: boundary circle,
310: travel path,
350: misalignment amount ϵ,
351: interpolation line

The invention claimed is:

1. A vehicle control device that controls vehicle behavior in such a manner that, when a host vehicle approaches an obstacle, the host vehicle does not come into contact with the obstacle, the vehicle control device comprising:
    obstacle detection means that detects a size of an obstacle which is existing around the host vehicle and a relative position and a relative speed of the detected obstacle with respect to the host vehicle;
    vehicle motion detection means that detects a motion state of the host vehicle; and
    obstacle virtual linking means that virtually links a plurality of obstacles detected by the obstacle detection means and recognizes the plurality of obstacles as one obstacle, wherein
    the obstacle virtual linking means comprises obstacle link length setting means that sets an obstacle link length, which serves as a determination criterion for linking obstacles with each other, and determines the obstacle link length based on the relative position and relative speed of an obstacle with respect to the host vehicle, as well as on the size of the host vehicle, and the obstacle virtual linking means executes a linking of the plurality of obstacles if a gap between the plurality of obstacles is shorter than the obstacle link length, whereas the obstacle virtual linking means does not execute the linking of the plurality of obstacles if a gap between the plurality of obstacles is longer than the obstacle link length, wherein
    the vehicle behavior is controlled based on the results of such determination.

2. The vehicle control device according to claim 1, wherein the obstacle virtual linking means comprises travel path estimation means that estimates a travel path of the host vehicle based on the motion state detected from the vehicle motion detection means, and
    a pair of obstacles to be virtually linked is selected in accordance with the estimated travel path and the relative positions of the obstacles detected by the obstacle detection means.

3. The vehicle control device according to claim 1, wherein the obstacle virtual linking means selects, from each of a left area and a right area relative to the travel path of the host vehicle, a pair comprising an obstacle that is existing further than a predetermined distance from the host vehicle and an obstacle that is existing closer than the predetermined distance, and virtually links them as a pair of obstacles.

4. The vehicle control device according claim 1, wherein the obstacle virtual linking means selects, from a plurality of obstacles that are existing further than a predetermined distance from the host vehicle, a pair of obstacles wherein a distance between an obstacle belonging to a left area relative to the travel path and the other obstacle belonging to a right area is shortest, and virtually links them as a pair of obstacles.

5. The vehicle control device according to claim 1, further comprising vehicle control determination means that calculates a yaw moment control amount required for avoiding an obstacle based on the relationship between the obstacle and the host vehicle obtained by the obstacle detection means and the obstacle virtual linking means.

6. The vehicle control device according to claim 5, wherein, if the obstacle or the virtually linked obstacle is existing within the predetermined distance from the host vehicle along the travel path of the host vehicle, the vehicle control determination means determines the obstacle to be an avoidance control subject and calculates a yaw moment control amount required for avoiding the avoidance control subject.

7. The vehicle control device according to claim 6, wherein the vehicle control determination means calculates the yaw moment control amount in accordance with the distance to the avoidance control subject from a position in the predetermined distance from the host vehicle.

8. The vehicle control device according to claim 3, wherein the predetermined distance is a distance traveled by the host vehicle within a predetermined time.

9. A vehicle control method that controls vehicle behavior in such a manner that, when a host vehicle approaches an obstacle, the host vehicle does not come into contact with the obstacle, wherein
 a size of an obstacle that is existing around the host vehicle and a relative position and a relative speed of the obstacle with respect to the host vehicle are detected,
 a motion state of the host vehicle is detected,
 a detected plurality of obstacles are virtually linked and recognized as one obstacle,
 an obstacle link length, which serves as a determination criterion for linking obstacles with each other, is determined and set based on the relative position and the relative speed of the obstacle with respect to the host vehicle, as well as on the size of the host vehicle, and
 a linking of the plurality of obstacles is executed if a gap between the plurality of obstacles is shorter than the obstacle link length, whereas the linking is not executed if a gap between the plurality of obstacles is longer than the obstacle link length, wherein
 the vehicle behavior is controlled based on the results of such determination.

10. The vehicle control method according to claim 9, wherein
 a travel path of the host vehicle is estimated based on the detected motion state, and
 a pair of obstacles to be virtually linked is selected in accordance with the estimated travel path and the detected relative positions of the obstacles.

11. The vehicle control method according to claim 10, wherein, from each of a left area and a right area relative to the travel path, a pair comprising an obstacle that is existing further than a predetermined distance from the host vehicle and an obstacle that is existing closer than the predetermined distance is selected, and they are virtually linked as a pair of obstacles.

12. The vehicle control method according to claim 10, wherein, from a plurality of obstacles that are existing further than a predetermined distance from the host vehicle, a pair of obstacles wherein a distance between an obstacle belonging to a left area relative to the travel path and the other obstacle belonging to a right area is shortest is selected, and they are virtually linked as a pair of obstacles.

13. The vehicle control method according to claim 9, wherein a yaw moment control amount required for avoiding an obstacle is calculated based on the relationship between the obstacle and the host vehicle.

14. The vehicle control method according to claim 13, wherein, if the obstacle or the virtually linked obstacle is existing within the predetermined distance from the host vehicle along the travel path of the host vehicle, the obstacle is determined as being an avoidance control subject, and a yaw moment control amount required for avoiding the avoidance control subject is calculated.

15. The vehicle control method according to claim 14, wherein the yaw moment control amount is calculated in accordance with the distance to the avoidance control subject from a position in the predetermined distance from the host vehicle.

16. The vehicle control method according to claim 11, wherein the predetermined distance is a distance traveled by the host vehicle within a predetermined time.

* * * * *